(12) United States Patent
Liu et al.

(10) Patent No.: US 7,526,949 B1
(45) Date of Patent: May 5, 2009

(54) HIGH RESOLUTION COHERENT DUAL-TIP SCANNING PROBE MICROSCOPE

(75) Inventors: Jony Jiang Liu, Olney, MD (US); Gerald J. Iafrate, Raleigh, NC (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 50 days.

(21) Appl. No.: 11/499,971

(22) Filed: Jul. 21, 2006

(51) Int. Cl.
*G01B 5/28* (2006.01)
*G01N 13/12* (2006.01)
*G01N 13/16* (2006.01)

(52) U.S. Cl. .......................... 73/105; 250/306; 250/307
(58) Field of Classification Search ................... 73/105; 250/306, 307
See application file for complete search history.

(56) References Cited

U.S. PATENT DOCUMENTS

| | | | |
|---|---|---|---|
| 4,343,993 | A | 8/1982 | Binnig et al. |
| 5,235,187 | A | 8/1993 | Arney et al. |
| 5,600,137 | A | 2/1997 | Saito et al. |
| 6,028,305 | A | 2/2000 | Minne et al. |
| 6,059,982 | A * | 5/2000 | Palagonia et al. ............. 216/11 |
| 6,401,526 | B1 * | 6/2002 | Dai et al. ....................... 73/105 |
| 6,458,206 | B1 * | 10/2002 | Givargizov et al. ......... 117/101 |
| 6,465,782 | B1 * | 10/2002 | Kendall ....................... 250/306 |
| 6,504,152 | B2 * | 1/2003 | Hantschel et al. ........... 250/306 |
| 6,545,492 | B1 | 4/2003 | Altmann et al. |
| 6,583,411 | B1 | 6/2003 | Altmann et al. |

OTHER PUBLICATIONS

Albrecht, T. R. et al. "Observation of tilt boundaries in graphite by scanning tunneling microscopy and associated multiple effects" Appl. Phys. Lett. 52, Feb. 1988, pp. 362-364.*
Park, Sang-Il et al. "Chemical dependence of the multiple-tip effect in scanning tunneling microscopy" Phys. Rev. B 38, Aug. 1988, pp. 4269-4272.*
Binnig, G. et al., "Surface Studies by Scanning Tunneling Microscopy," Phys. Rev. Lett., vol. 49, No. 1, pp. 57-61, Jul. 5, 1982.
Binnig, G. et al., "Scanning Tunneling Microscopy—from Birth to Adolescence," Rev. Mod. Phys., vol. 59, No. 3, Part. 1, pp. 615-625, Jul. 1987.

* cited by examiner

*Primary Examiner*—Daniel S Larkin
(74) *Attorney, Agent, or Firm*—Edward L. Stolarum; Lawrence E. Anderson

(57) ABSTRACT

A high-resolution scanning probe microscope using a coherent dual-tip probe comprises two single-atom protrusions on a single crystal metal wire. As the dual-tip probe scans across the surface of a sample material under an electrical bias, an interferenced electron wave function formed by two protruding atoms interacts with electron wave functions of the sample surface. Such an interferenced wave function has a distinctive pattern of electron wave density as high as four times that of a single-atom tip. A more distinctive microscopic image of the sample surface is therefore generated. The resolution of the dual-tip scanning probe microscopic image is also higher than that obtained by a single-tip probe because the interferenced electron wave function provides a confined and densely distributed interactive region.

20 Claims, 5 Drawing Sheets

HIGH RESOLUTION COHERENT DUAL-TIP SCANNING PROBE MICROSCOPE

GOVERNMENT INTEREST

The invention described herein may be manufactured, used, and/or licensed by or for the United States Government.

BACKGROUND OF THE INVENTION

1. Field of the Invention

The invention generally relates to scanning tunneling measuring devices, and more particularly to a scanning tunneling microscope probe used for scanning a sample surface.

2. Description of the Related Art

The scanning tunneling microscope (STM) has become one of the most powerful tools used in studying the surface structure of electrically conducting solid state materials at an atomic resolution. Descriptions of the general structure and operation of STMs are generally provided in U.S. Pat. No. 4,343,993 issued to Binnig et al.; Binnig, G. et al., "Surface Studies by Scanning Tunneling Microscopy," Phys. Rev. Lett., Vol. 49, No. 1, pp. 57-61, Jul. 5, 1982; and Binnig, G. et al., "Scanning Tunneling Microscopy—from Birth to Adolescence," Rev. Mod. Phys., Vol. 59, No. 3, Part. 1, pp. 615-625, July 1987, the complete disclosures of which, in their entireties, are herein incorporated by reference.

By raster-scanning a single sharp probing tip above a sample surface within a vertical distance of a few nanometers, the topological structure of the sample surface can be mapped out at the resolution of an atomic scale. This topological detail is detected through the intensity of the electron tunneling current between the probing tip and the surface atomic protrusions. An electrical bias of a few volts (for example, approximately 1 to 5 volts) is applied between the tip and sample. Moreover, a piezo drive tube is used to control the position and movement of the probing tip.

Since its conception, the STM has had the greatest impact in the field of modern surface science because of its superior capability of characterizing and resolving the surface atomic structures and defects. Surface features such as atomic point defects, dislocations, and grain boundary identification can routinely be studied using a STM. Furthermore, STMs also allow the characterization of step structures at the atomic level during the processes of surface preparation and growth of semiconductors, such as epitaxial growth on semiconductor structures.

However, even though the atomic resolution of a surface can routinely be obtained using a STM, the interpretation of the experimental results is often quite difficult, or even impossible due to the following reasons. For example, it is well known that maxima in topographic STM images may not necessarily correspond to atomic positions. This is particularly the case for semiconductor surfaces in which the effects of surface electronic structure play an important role for the interpretation. In the case of metals, effects of electronic structure play only a minor role. However, an atomically-resolved disordered surface structure cannot be interpreted in a unique way. Moreover, interference of electronic states from several different atomic sites, and possible image contrast reversal as a function of tip-sample separation due to the interaction between the probe tip and the sample surface, may prevent the extraction of reliable information from STM images of disordered sample surfaces.

Unfortunately, STMs have been generally unable to resolve amorphous structures atomically. For quasi-crystalline structures, STM studies have revealed lattices with atomic resolution. However, it is extremely difficult, and in some cases practically impossible, to extract the atomic information from experimental results because the assignment of maxima in topographic STM images to particular atomic species has generally been unclear and unfocused. As such, the industry has suggested that at least some imaged reference lattice is required simultaneously to facilitate the interpretation of experimental results.

FIG. 1 illustrates the physical structure of a conventional single-tip STM system and a sample surface on which it is probing. During operation, the single-tip microscope probe 2, which in the conventional systems, generally comprises a single probing tip 25, which moves across the sample surface 1 with its motions controlled by a piezo controller 3 in nanometer precision. An electrical bias 5 is applied between the probing tip 25 and the surface atoms 9 on the sample surface 1. An electronic current (A) feedback monitoring circuit 6, which is controlled by an electronic control circuit 4, detects the interaction between the probing tip 25 and surface atoms 9. The output of the electronic current feedback monitoring circuit 6 directly reflects the interaction of the probing tip 25 and the sample surface 1.

Further processing of the electronic signals provides the topological structure of surface atoms 9. FIG. 2 shows such an interactive mechanism of a conventional single probe STM illustrating electron wave functions 7 of the surface atoms 9 of the sample surface 1 and the electron wave function 8 of the protruding atom 10 of the probing tip 25. The double arrows in FIGS. 1 and 2 indicate the horizontal bi-directional scanning movement of the probing tip 25.

Generally, conventional STMs are not primarily sensitive to atomic positions, but rather to those electronic states that protrude into the vacuum region (the entire system is contained inside a vacuum chamber, which is not shown in the figures) and significantly overlap with the electron wave function 8 of the probing tip 25. The information obtained reflects a convolution of electronic states at the sample surface 1 and the apex (protruding atom 10) of the probing tip 25. Thus, in conventional STMs, it is desirable to use tips with a less prominent electronic structure (for example, the ground state of a metal atom) in order to exclude the influence of the tip's electronic structure.

Additionally, many other types of probing microscopes, such as atomic force microscopes (AFM), magnetic force microscopes (MFM), and optical tunneling microscopes (OTM) have also been developed in the industry. Generally, these other types of probing microscopes are based on the interaction between single probing tips and the sample surface. Moreover, these other types of probing microscopes also generally face the same challenge of the interpretation of results as found in conventional STMs. Therefore, there remains a need for a novel probing microscope capable of facilitating the interpretation of experimental results of sample surface probing.

SUMMARY OF THE INVENTION

In view of the foregoing, an embodiment of the invention provides a microscope probe for scanning a sample surface, wherein the scanning tunneling microscope probe comprises a pair of geometrically identical probe tips each comprising a single protruding atom formed of a substantially identical crystal lattice as one another, and wherein the probe tips are proximally spaced apart and are configured such that two in-phase coherent electron waves emanating from the probe tips interact with electron waves emanating from surface atoms of the sample surface. Moreover, the two in-phase coherent electron waves provide an interferenced electron wave function distribution with a periodicity of maxima of an atomic scale.

The interaction of the two in-phase coherent electron waves emanating from the probe tips with the electron waves emanating from surface atoms of the sample surface comprises an electronic signal of interaction, wherein the electronic signal of interaction comprises an expected tunneling current intensity proportional to protrusions of the protruding atoms. Furthermore, a maximum of the expected tunneling current intensity is defined by an interference pattern of the electronic signal of interaction, which can be as high as four times that of a single-tip probe. Additionally, the microscope probe may be configured in any of an atomic force microscope, a magnetic force microscope, and an optical tunneling microscope.

Another aspect of the invention provides a method of scanning a sample surface, wherein the method comprises positioning a pair of geometrically identical microscope probe tips over the sample surface, wherein each probe tip comprises a single protruding atom formed of a substantially identical crystal lattice as one another; spacing the probe tips proximally apart from one another; applying an electrical bias between the probe tips and the sample surface thereby causing electron waves to emanate from the probe tips and the sample surface; detecting an electronic signal of interaction of two in-phase coherent electron waves emanating from the probe tips with an electron wave emanating from surface atoms of the sample surface; and processing the electronic signal to provide a topological structure of the surface atoms of the sample surface, wherein the two in-phase coherent electron waves provide an interferenced electron wave function distribution with a periodicity of maxima of an atomic scale, and wherein the electronic signal of interaction comprises an expected tunneling current intensity proportional to protrusions of the protruding atoms. Additionally, a maximum of the expected tunneling current intensity is defined by an interference pattern of the electronic signal of interaction.

Also, the invention provides a system for scanning a sample surface, wherein the system comprises means for positioning a pair of geometrically identical microscope probe tips over the sample surface, wherein each tip comprises a single protruding atom formed of a substantially identical crystal lattice as one another; means for spacing the probe tips proximally apart from one another; means for applying an electrical bias between the probe tips and the sample surface thereby causing electron waves to emanate from the probe tips and the sample surface; means for detecting an electronic signal of interaction of two in-phase coherent electron waves emanating from the probe tips with an electron wave emanating from surface atoms of the sample surface; and means for processing the electronic signal to provide a topological structure of the surface atoms of the sample surface, wherein the two in-phase coherent electron waves provide an interferenced electron wave function distribution with a periodicity of maxima of an atomic scale, wherein the electronic signal of interaction comprises an expected tunneling current intensity proportional to protrusions of the protruding atoms, and wherein a maximum of the expected tunneling current intensity is defined by an interference pattern of the electronic signal of interaction.

Advantages of the invention include the features that the two probe tips on the dual-tip microscope probe are based on the same crystal lattice. As such, the electronic states of the probe tips are coherent during the interaction with the sample surface. Moreover, surface topological features can be determined with much more clarity by the interaction with two tips of the same phase. Also, the contrast and strength of the interaction signal generated by a dual-tip microscope probe are as much as four times that of a conventional single-tip probe. Third, the dual-tip microscope probe provided by the invention will be complimentary to the results obtained by point-to-point interaction of single-tip probing and furthermore provides high-precision surface atomic structure identification and interpretation.

Moreover, the invention's coherent dual-tip system provides a distinctively interferenced electron wave distribution with a periodicity of maxima of an atomic scale, which will be able to generate high intensity and high resolution images. The resolution of this dual-tip scanning probe microscopic image is also higher than that obtained by a single-tip probe because the interferenced electron wave function provides a confined and densely distributed interactive region. Thus, nearby atomic protrusions produce an interferenced electron wave that is distinguishable in half of the atomic spacing. Accordingly, the scanning image is formed by the interaction between a localized electron wave function, whose tunneling current intensity is proportional to the protrusions of the atoms.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

Figure 1:
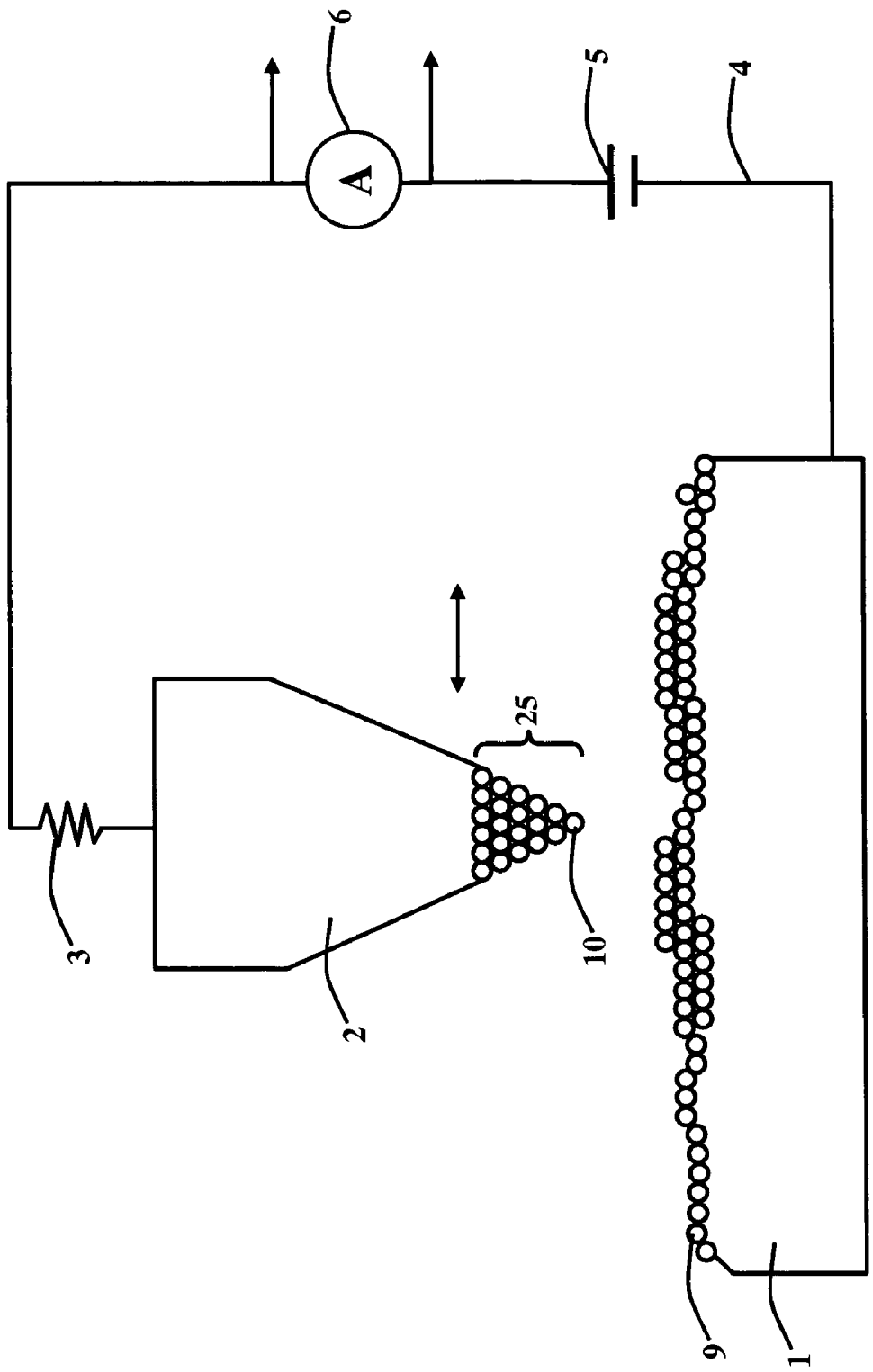
FIG. 1 is a schematic diagram of a conventional scanning tunneling microscope apparatus.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Figure 3:
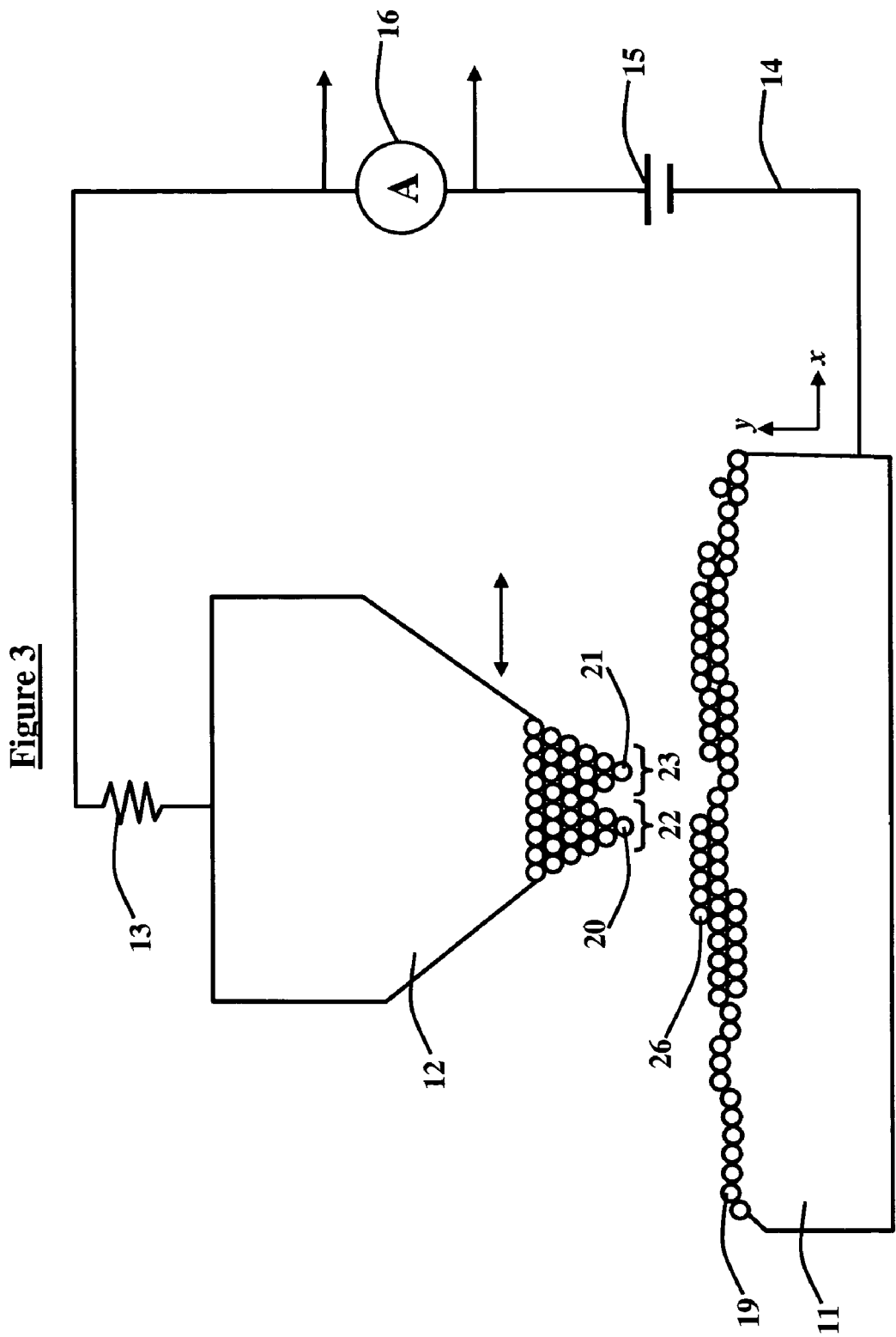
FIG. 3 is a schematic diagram of a scanning tunneling microscope apparatus according to an embodiment of the invention.
Figure 4:
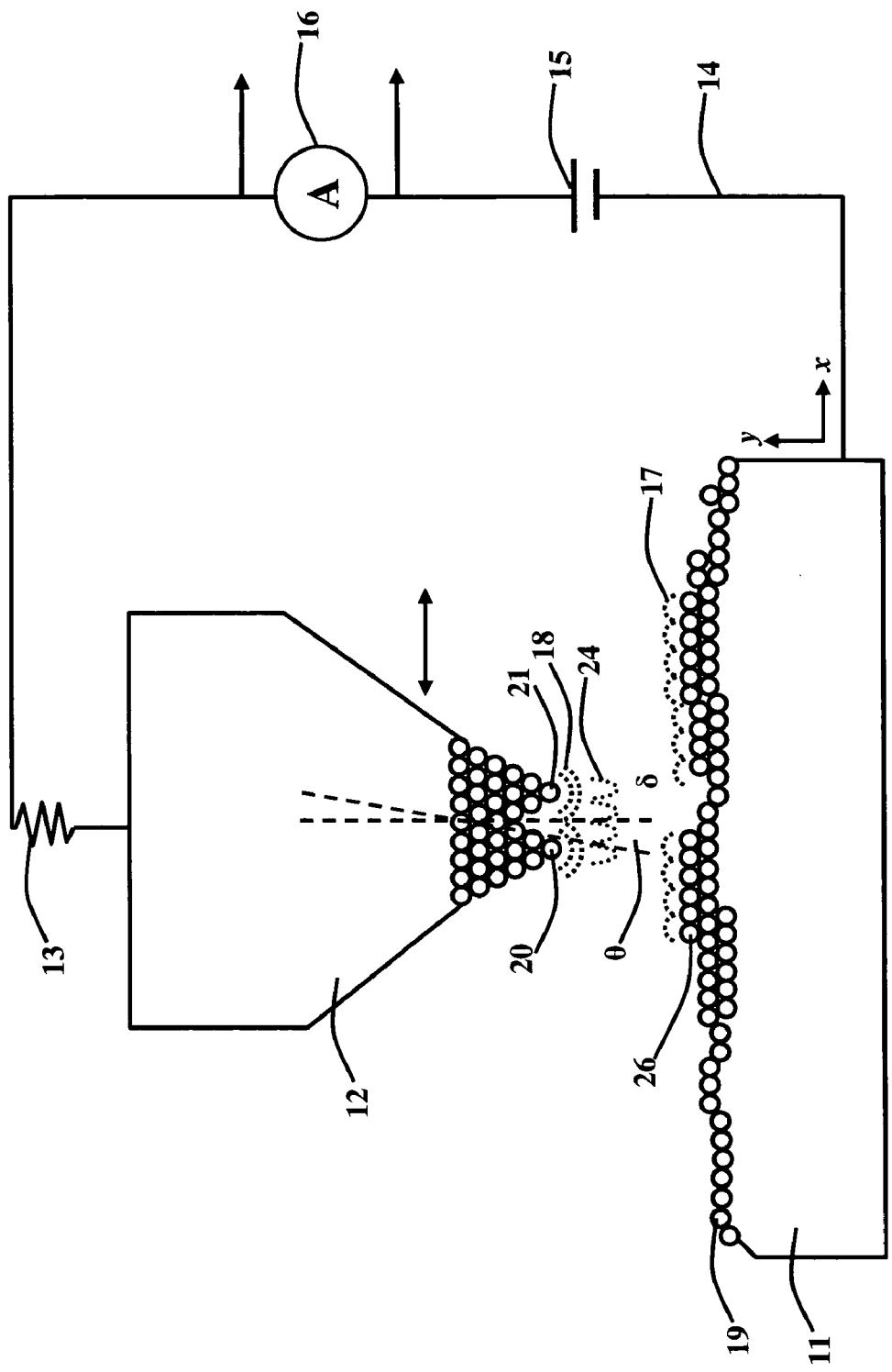
FIG. 4 is a schematic diagram of a scanning tunneling microscope apparatus during operation according to an embodiment of the invention.
Figure 5:
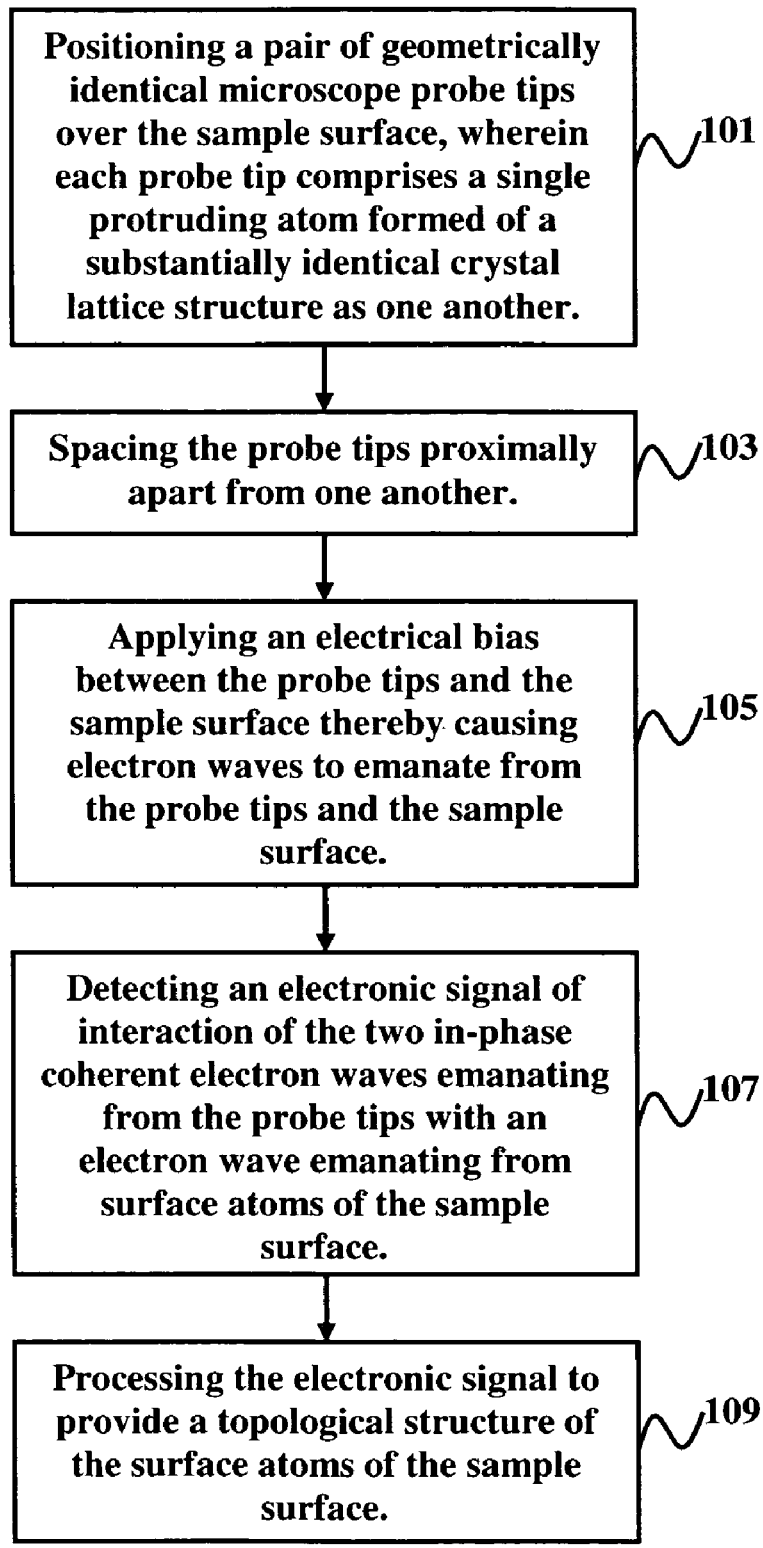
FIG. 5 is a flow diagram illustrating a preferred method of an embodiment of the invention.

As previously mentioned, there remains a need for a novel probing microscope capable of facilitating the interpretation of experimental results of sample surface probing. In order to solve this need, an embodiment of the invention provides a high-resolution scanning probe microscope using a coherent dual-tip probe comprising two single-atom protrusions on a single crystal metal wire. Referring now to the drawings, and more particularly to FIGS. 3 through 5, there are shown preferred embodiments of the invention. FIG. 3 illustrates a dual-tip STM and a sample surface on which it is probing according to an embodiment of the invention. During operation, the dual-tip microscope probe 12, which generally comprises dual coherent atomic tips 22, 23 each having protruding atoms 20, 21, respectively, moves across the sample surface 11 with its motions controlled by a piezo controller 13 in nanometer precision. The piezo controller 13 moves the dual-tip microscope probe 12 in a microscale range, and is electrically powered by an external power source (not shown). The double arrows in FIGS. 3 and 4 indicate the horizontal bi-directional scanning movement of the probing tip 25. Moreover, an electrical bias 15 is applied between the atomic tips 22, 23 and the sample surface 11.

In other words, in a tunneling spectroscopic scan, the dual-tip microscope probe 12 is positioned above a pre-selected sample surface 11 and an electrical bias 15 is applied between them (i.e., between the dual-tip microscope probe 12 and the pre-selected sample surface 11). An electronic feedback circuit 16, which is controlled by an electronic control circuit 14, detects the interaction between the atomic tips 22, 23 and surface atoms 19, 26. The electronic feedback circuit 16 provides signal according to the strength of the interaction between the dual-tip microscope probe 12 and sample surface 11. Stronger interactions caused by the maximum of the electron wave function and protruding surface atoms 26 on the sample surface 11 produce stronger electronic signals. Further processing of the electronic signals provides the topological structure of surface atoms 19, 26, wherein some electronic signal processing may be applied in the electronic feedback circuit 16 for calibration, noise filtering, and noise reduction.

Figure 2:
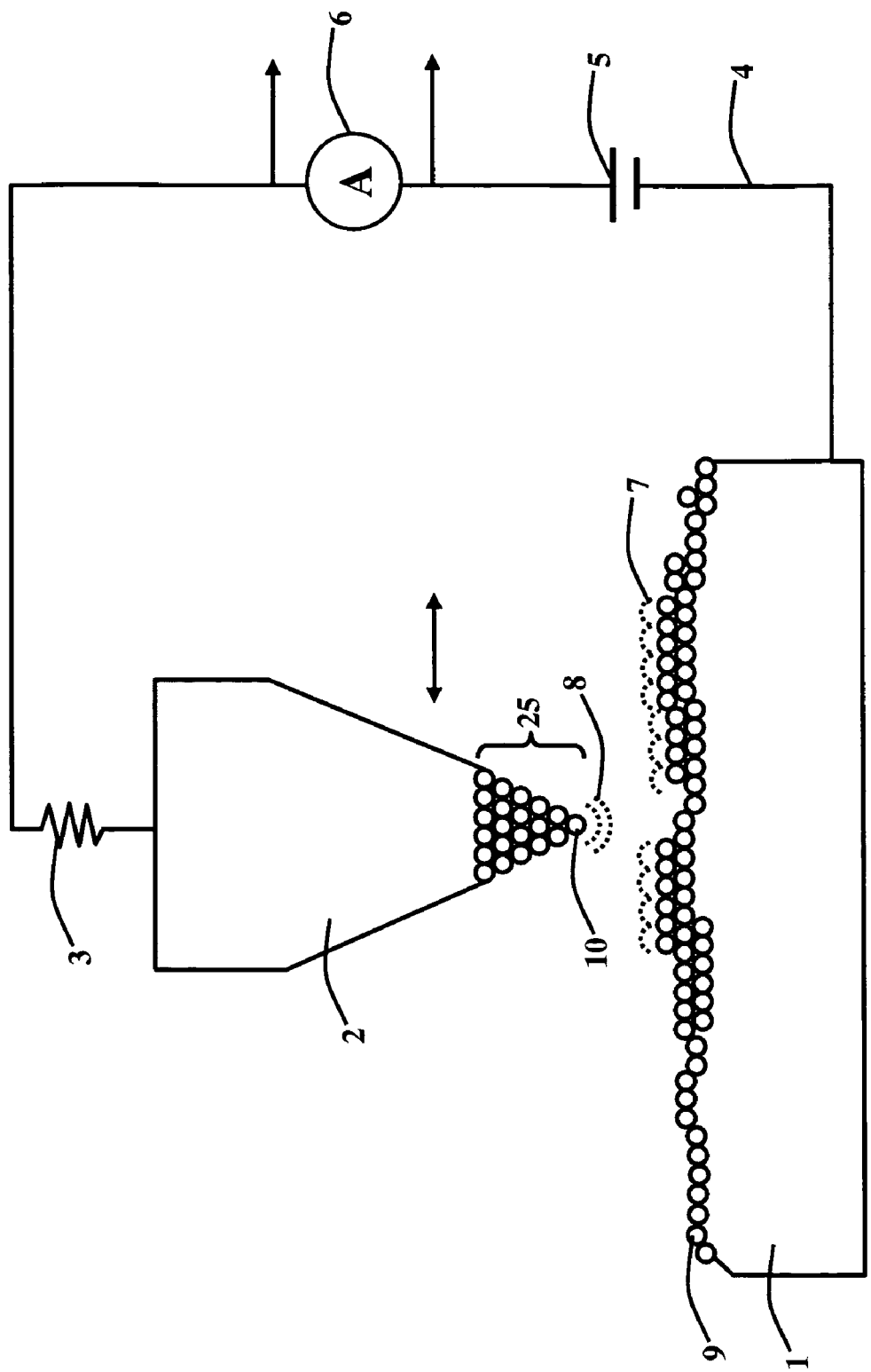
FIG. 2 is a schematic diagram of a conventional scanning tunneling microscope apparatus during operation.

FIG. 4 shows such an interactive mechanism of a dual-tip probe STM illustrating electron wave functions 17 of the protruding surface atoms 26 of the sample surface 11 and the electron wave functions 18 of the protruding atoms 20, 21 of the atomic tips 22, 23. The pattern of interferenced electron wave functions (i.e., signal of interaction) 24 (with a periodicity of maxima, δ) from the two coherent atomic tips 22, 23 provides a high-contrast and high-resolution dual-tip microscope probe 12. The dual-tip configuration utilizes the interference pattern 24 of the electron waves 18 and experimental results indicate that using more than two tips does not give a distinctive electron wave pattern. As such, the invention's dual-tip configuration is advantageous over both the conventional single-tip configurations (FIGS. 1 and 2) and other non dual-tip configurations.

More specifically, the two in-phase coherent electron waves provide an interferenced electron wave function distribution I with a periodicity of maxima, δ, in the form of:

$$I = 2I_o\left[1 + \cos\left(\frac{2\pi x}{\delta}\right)\right], \quad (1)$$

$$\delta = \lambda\frac{d}{a}, \quad (2)$$

where $I_O$ is the maximum intensity of the electron wave function of an atomic tip 22, 23; x is the horizontal coordinate on the sample surface 11; λ is the de Broglie wavelength of electrons, d is the distance from the atomic tip 22, 23 to the sample surface 11; and a is the separation between the two atomic tips 22, 23.

The de Broglie wavelength of electrons under a tip bias of V (volt) can be expressed as $\lambda = h/\sqrt{2meV}$, where h is Planck's constant ($6.626\times10^{-34}$ J·s) and m is the mass of the electron. For a bias of 2 volts, the wavelength of electrons is calculated to be 8.69 Å. Under the STM configuration provided by the embodiments of the invention, d and a are comparable in value. According to experimental verification of an embodiment of the invention, it has been determined from equation (1) that the maximum intensity of an interferenced electron wave function can be four times stronger than that of a single electron wave function.

As such, to further advance the surface probing technique used in microscopy, an embodiment of the invention provides a dual-tip microscope probe 12 composed of multiple protruding atomic probe tips (preferably two protruding atomic probe tips) 22, 23. Such a dual-tip microscope probe 12 can be fabricated from a single crystal material to replace the single-tip probe 2 in a conventional STM (shown in FIGS. 1 and 2). The two probe tips 22, 23 are a part of the same crystal lattice structure and are closely located in the order of tens of a lattice constant or less. As such, the two probe tips 22, 23 may comprise any of the well-known crystal lattices. Moreover, the electronic states of the two probe tips 22, 23 are phase coherent during the interaction with the sample surface 11. In the context of the embodiments of the invention, the phrase "phase coherent" refers to electron wave functions emitting from the two probe tips 22, 23 that are propagating in the same direction, with the same frequency, and with the same time delay.

After the electrical bias 15 is applied between the dual-tip microscope probe 12 and the sample surface 11, two coherent electron wave functions 18 from the two probe tips 22, 23 interact with the surface electronic states (electron wave functions 17) which are determined by the applied electrical bias 15. Consequently, the STM detects the signal of interaction 24 between site-specific surface states (electron wave functions 17) and the two coherent electron wave functions 18. With the two probe tips 22, 23 being geometrically identical, the expected tunneling current intensity is proportional to the intensity of electron wave function, I:

$$I(x,y,\theta) = I_O^2[2\alpha^2 + 2\alpha\Phi(x,y,\theta)], \quad (3)$$

where α is the interacting medium-dependent constant and equals 1 (one) in the vacuum; $I_O$ is the intensity of the wave function of a single-tip probe; Φ(x,y,θ) is a position dependent phase factor and is in a sinusoidal form. In the case of linear scanning movement along the x direction, Equation (3) reduces to Equation (1). The maximum value of Φ(x,y,θ) equals 1 (one). The tunneling current intensity corresponds directly to the surface topological details, and indicates that areas with protruding surface atoms 26 that are closer to the probe tips 22, 23 will have higher tunneling currents then surface atoms 19 which are not as close to the probe tips 22, 23.

FIG. 5 illustrates (with reference to reference element numerals provided in FIGS. 3 and 4) a flow diagram of a method of scanning a sample surface 11, wherein the method comprises positioning (101) a pair of geometrically identical microscope probe tips 22, 23 over the sample surface 11, wherein each probe tip 22, 23 comprises a single protruding atom 20, 21, respectively, formed of a substantially identical crystal lattice as one another. The next steps involve spacing (103) the probe tips 22, 23 proximally apart from one another, and applying (105) an electrical bias 15 between the probe tips 22, 23 and the sample surface 11 thereby causing electron waves 18, 17 to emanate from the probe tips 22, 23 and the sample surface 11, respectively.

Next, the method involves detecting (107) an electronic signal of interaction 24 of the two in-phase coherent electron waves 18 emanating from the probe tips 22, 23 with electron waves 17 emanating from surface atoms 19, 26 of the sample surface 11, and processing (109) the electronic signal to provide a topological structure of the surface atoms 19, 26 of the sample surface 11, wherein the two in-phase coherent electron waves 18 provide an interferenced electron wave function distribution with a periodicity of maxima of an atomic scale, and wherein the electronic signal of interaction 24 comprises an expected tunneling current intensity proportional to protrusions of the protruding atoms 20, 21. Additionally, a maximum of the expected tunneling current intensity is defined by an interference pattern (of the electronic signal of interaction) 24.

With the invention's dual-tip probe geometry, the maximum intensity of tunneling current or the signal intensity of the microscope is four times higher than that of a conventional single-tip probe. This maximum intensity region is also well defined by the interference pattern 24 of the electron wave function and is therefore spatially limited. The interference with the less protrusive surface atoms 19 is less significant than with the protruding surface atoms 26. This property of the invention's dual-tip microscope probe 12 produces a high contrast and high resolution image for the surface of the scanning sample 11.

Generally, the invention provides a dual-tip microscope probe 12 for scanning a sample surface 11, wherein the dual-tip microscope probe 12 comprises a first protruding atom 20 emanating a first electron wave, and a second protruding atom 21 proximally spaced apart from the first protruding atom 20, wherein the second protruding atom 21 emanates a second electron wave, wherein the first and second protruding atoms 20, 21 are proximally spaced apart from one another, and wherein the first and second electron waves are in-phase coherent electron waves 18 and interact with electron waves 17 emanating from surface atoms 19, 26 of the sample surface 11. Accordingly, the in-phase coherent electron waves 18 provide an interferenced electron wave function distribution with a periodicity of maxima of an atomic scale, and an interaction of the in-phase coherent electron waves 18 with the electron waves 17 of surface atoms 19, 26 of the sample surface 11 comprises an electronic signal of interaction 24. Also, the electronic signal of interaction comprises an expected tunneling current intensity proportional to protrusions of the first and second protruding atoms 20, 21, wherein a maximum of the expected tunneling current intensity is defined by an interference pattern 24 of the electronic signal of interaction.

Advantages of the invention include the features that the two atomic probe tips 22, 23 on the dual-tip microscope probe 12 are based on the same crystal lattice, as such the electronic states of the atomic probe tips 22, 23 are coherent during the interaction with the sample surface 11. Moreover, surface topological features can be determined with much more clarity by the interaction with two atomic probe tips 22, 23 of the same phase. Also, the contrast and strength of the interaction signal generated by a dual-tip microscope probe 12 are as much as four times that of a conventional single-tip probe 2. Third, the dual-tip microscope probe 12 provided by the invention is complimentary to the results obtained by point-to-point interaction of single-tip probing and furthermore provides high-precision surface atomic structure identification and interpretation.

Moreover, the invention's coherent dual-tip system provides a distinctively interferenced electron wave distribution, I, with a periodicity of maxima, δ, of an atomic scale, which will be able to generate high intensity and high resolution images. The resolution of this dual-tip scanning probe microscopic image is also higher than that obtained by a single-tip probe because the interferenced electron wave function provides a confined and densely distributed interactive region. Thus, nearby atomic protrusions produce an interferenced electron wave that is distinguishable in half of the atomic spacing. Accordingly, the scanning image is formed by the interaction between a localized electron wave function, whose tunneling current intensity is proportional to the protrusions of the atoms.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

What is claimed is:

1. A microscope probe for scanning a sample surface, said microscope probe comprising:
   a pair of geometrically identical probe tips formed in the structure of a crystal lattice each comprising a single protruding atom,
   wherein said probe tips are closely located in the order of tens of a lattice constant or less and are oriented in the structure of the lattice such that two in-phase coherent electron waves emanating from said probe tips provide an interference electron wave function distribution with a periodicity of maxima of an atomic scale and interact with electron waves emanating from surface atoms of said sample surface.

2. The microscope probe of claim 1, wherein said probe tips are spaced apart a distance within the coherence length, and the interaction of said two in-phase coherent electron waves emanating from said probe tips with said electron waves emanating from surface atoms of said sample surface comprises an electronic signal of interaction from which the topography of the sample surface can be determined.

3. The microscope probe of claim 2, wherein said first and second tips are part of the same crystal lattice structure and said electronic signal of interaction comprises a tunneling current intensity proportional to protrusions of said protruding atoms.

4. The microscope probe of claim 1, wherein said microscope probe is a coherent double-tip microscope probe.

5. The microscope probe of claim 1, wherein said microscope probe is configured in any of a scanning tunneling microscope, an atomic force microscope, a magnetic force microscope, and an optical tunneling microscope.

6. A microscope probe for use in scanning tunneling microscopy (STM) to scan a sample surface, said microscope probe comprising:
   a base;
   a first probe portion formed of a crystal lattice structure connected to said base, said first probe portion having a first apex consisting of only a single, first atom formed within the structure of the lattice;
   a second probe portion formed of a substantially identical crystal lattice structure as said first tip connected to said base, said second probe portion being substantially identical in configuration to said first portion with a second apex consisting of only a single second atom formed within the structure of the lattice and oriented with respect to the first atom to produce in-phase coherent electron waves a predetermined periodicity apart;
   means for applying a bias on said apexes to thereby cause electron waves to emanate from said first and second atoms to the sample surface, said first and second atoms closely located in the order of tens of a lattice constant or less such that each provides in-phase coherent electron waves which interact to produce combined waves of greater intensity than each of said in-phase coherent electron waves,
   said first and second apexes controllably adapted to be positioned a predetermined equidistance from the sample surface;
   said combined waves adapted to interact with electron waves from surface atoms of said sample surface to produce an electronic signal of interaction with a tunneling current intensity proportional to the protrusions of the atoms on the sample surface,
   means for detecting the tunneling current intensity to thereby determine the surface topography of the sample surface at an atomic level.

7. The microscope probe of claim 6, wherein the maximum of the tunneling current intensity defined by the interference pattern of the electronic signal of interaction can be four times as high as that obtained with a single-tip microscope probe.

8. The microscope probe of claim 7, wherein said in-phase coherent electron waves are substantially identical and the wave functions of said combined waves are interference electron wave function distributions with a periodicity of maxima of an atomic scale.

9. The microscope probe of claim 7, wherein said microscope probe is a coherent dual tip microscope probe and said apexes are spaced apart a distance from each other that is within the coherence length.

10. The microscope probe of claim 9, wherein the maximum of the tunneling current intensity defined by the interference pattern of the electronic signal of interaction can be four times as high as that obtained with a single-tip microscopic probe.

11. The microscope probe of claim 10, wherein said first and second probe portions are part of the same crystal lattice structure.

12. The microscope probe of claim 7, wherein said first and second probe portions are part of the same crystal lattice structure.

13. A method of scanning a sample surface, said method comprising:
   positioning a pair of substantially geometrically identical microscope probe tips at an equal distance from said sample surface, wherein each probe tip has an apex consisting of only a single protruding atom formed within a crystal lattice and oriented to produce in-phase coherent electron waves a predetermined periodicity apart;
   spacing said two tips in the order of tens of a lattice constant or less apart from one another;
   applying an electrical bias between said probe tips and said sample surface thereby causing electron waves to emanate from said probe tips and said sample surface;
   detecting an electronic signal of interaction of two in-phase coherent electron waves emanating from said probe tips with an electron wave emanating from surface atoms of said sample surface; and
   processing said electronic signal to provide a topological structure of said surface atoms of said sample surface.

14. The method of claim 13, wherein said two in-phase coherent electron waves provide an interference electron wave function distribution with a periodicity of maxima of an atomic scale.

15. The method of claim 13, wherein said electronic signal of interaction comprises an expected tunneling current intensity proportional to protrusions of said protruding atoms.

16. The method of claim 15, wherein a maximum of said expected tunneling current intensity is defined by an interference pattern of said electronic signal of interaction.

17. A system for scanning a sample surface, said system comprising:
   means for positioning a pair of substantially geometrically identical microscope probe tips at an equal distance from said sample surface, wherein each tip has an apex consisting of only a single protruding atom formed within a substantially identical crystal lattice structure as one another and oriented to produce in-phase coherent electron waves a predetermined periodicity apart;
   means for spacing said probe tips in the order of tens of a lattice constant or less apart from one another;
   means for applying an electrical bias between said probe tips and said sample surface thereby causing electron waves to emanate from said probe tips and said sample surface;
   means for detecting an electronic signal of interaction of two in-phase coherent electron waves emanating from said probe tips with an electron wave emanating from surface atoms of said sample surface; and
   means for processing said electronic signal to provide a topological structure of said surface atoms of said sample surface.

18. The system of claim 17, wherein said two in-phase coherent electron waves provide an interference electron wave function distribution with a periodicity of maxima of an atomic scale.

19. The system of claim 17, wherein said electronic signal of interaction comprises an expected tunneling current intensity proportional to protrusions of said protruding atoms.

20. The system of claim 19, wherein a maximum of said expected tunneling current intensity is defined by an interference pattern of said electronic signal of interaction.

* * * * *